United States Patent
Kasahara

(10) Patent No.: US 10,379,554 B2
(45) Date of Patent: Aug. 13, 2019

(54) POWER SUPPLY APPARATUS AND PRINTING APPARATUS

(71) Applicant: CANON KABUSHIKI KAISHA, Tokyo (JP)

(72) Inventor: Takashi Kasahara, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/047,693

(22) Filed: Jul. 27, 2018

(65) Prior Publication Data

US 2019/0050010 A1 Feb. 14, 2019

(30) Foreign Application Priority Data

Aug. 10, 2017 (JP) ................................. 2017-155750

(51) Int. Cl.
*H02M 3/335* (2006.01)
*G05F 1/571* (2006.01)
*B41J 2/045* (2006.01)
*H02H 9/04* (2006.01)

(52) U.S. Cl.
CPC .......... *G05F 1/571* (2013.01); *B41J 2/0457* (2013.01); *B41J 2/04548* (2013.01); *B41J 2/04586* (2013.01); *H02H 9/046* (2013.01); *H02M 3/335* (2013.01); *H02M 3/3353* (2013.01)

(58) Field of Classification Search
CPC ......... H02M 3/33538; H02M 3/33546; H02M 3/33515; H02M 3/33576; H02M 3/33553; H02M 3/33507; H02M 3/33592; H02M 3/33523; H02M 3/3353; H02M 3/33569; G05F 1/571; H02H 9/046; B41J 2/04548; B41J 2/04586; B41J 2/0457
USPC ......... 363/21.12, 21.13, 21.15, 21.16, 21.17, 363/21.18
See application file for complete search history.

(56) References Cited

U.S. PATENT DOCUMENTS

| | | | |
|---|---|---|---|
| 8,814,327 B2 | 8/2014 | Takayanagi et al. | |
| 9,143,038 B2 | 9/2015 | Takayanagi et al. | |
| 2013/0002746 A1* | 1/2013 | Takayanagi | B41J 29/38 347/14 |
| 2015/0003118 A1* | 1/2015 | Shin | H02M 1/36 363/21.12 |

FOREIGN PATENT DOCUMENTS

JP 2009-195073 8/2009

\* cited by examiner

*Primary Examiner* — Nguyen Tran
*Assistant Examiner* — Bryan R Perez
(74) *Attorney, Agent, or Firm* — Venable LLP

(57) ABSTRACT

A power supply apparatus capable of switching an output voltage Vout based on an external control signal includes a control unit configured to perform control to stop an output from the power supply apparatus in a case where a voltage applied to a Vcc terminal is higher than a predetermined voltage Vovp. The Vcc terminal is connected to a primary-side auxiliary winding of a transformer via a regulator and the control unit operates based on power supplied to the Vcc terminal in normal operation. A base of an NPN transistor included in the regulator is connected to a ground via a first resistance R1 and a first zener diode ZD1. A second resistance R2 is provided between the base and a collector of the NPN transistor.

8 Claims, 7 Drawing Sheets

POWER SUPPLY APPARATUS AND PRINTING APPARATUS

BACKGROUND OF THE INVENTION

Field of the Invention

The present invention relates to an overvoltage protection technique in an output voltage switching type power supply apparatus.

Description of the Related Art

The use of an inkjet printing apparatus at home has become widespread in recent years. The inkjet printing apparatus has various functions so that a user can safely use the inkjet printing apparatus. An overvoltage protection function is known as one of such functions. More specifically, in a case where an output voltage becomes equal to or higher than a predetermined voltage, a control IC of a power supply apparatus performs control to stop the output. Such a power supply apparatus determines whether the output voltage becomes equal to or higher than the predetermined voltage based on whether a voltage (hereinafter referred to as "auxiliary winding voltage") supplied from a primary-side auxiliary winding to Vcc for the control IC becomes equal to or higher than a predetermined voltage.

In a power supply apparatus disclosed in Japanese Patent Laid-Open No. 2009-195073, the auxiliary winding voltage is suppled to Vcc via a voltage dropping unit (ZD1). In a case where the auxiliary winding voltage becomes equal to or higher than a predetermined voltage, the voltage dropping unit (ZD1) is short-circuited and the voltage supplied to Vcc immediately rises to the auxiliary winding voltage. In a case where this voltage rise is detected, the power supply apparatus disclosed in Japanese Patent Laid-Open No. 2009-195073 stops the output to realize the overvoltage protection function.

SUMMARY OF THE INVENTION

However, in the case of providing the power supply apparatus disclosed in Japanese Patent Laid-Open No. 2009-195073 with an output voltage switching function, there is an issue that a configuration of the power supply apparatus becomes complicated.

The reason is described below in detail. An output voltage switching type power supply apparatus is equipped with a regulator to maintain a voltage supplied to Vcc within a voltage range in which a control IC is operable even in a case where an output voltage Vout is switched to a high voltage. Since the regulator stabilizes the auxiliary winding voltage, the control IC cannot detect an abnormal rise in the output voltage Vout from a rise in the auxiliary winding voltage. A conventional output voltage switching type power supply apparatus therefore requires an overvoltage protection function based on over power protection (OPP) monitoring instead of monitoring of the auxiliary winding voltage. For the above reason, in the case of providing an output voltage switching type power supply apparatus with an overvoltage protection function, there is an issue that a configuration of a power supply apparatus becomes complicated.

The present invention provides an output voltage switching type power supply apparatus capable of realizing overvoltage protection with a simple configuration.

In the first aspect of the present invention, there is provided a power supply apparatus capable of switching an output voltage Vout based on an external control signal, the power supply apparatus comprising:

a control unit configured to perform control to stop an output from the power supply apparatus in a case where a voltage applied to a Vcc terminal is higher than a predetermined voltage Vovp, wherein the Vcc terminal is connected to a primary-side auxiliary winding of a transformer via a regulator and the control unit operates based on power supplied to the Vcc terminal in normal operation, a base of an NPN transistor included in the regulator is connected to a ground via a first resistance R1 and a first zener diode ZD1, a second resistance R2 is provided between the base and a collector of the NPN transistor, and in a case where a rectified voltage obtained by rectifying an output from the auxiliary winding is denoted by Vaux, the rectified voltage Vaux at a time the output voltage Vout reaches a voltage at which the output from the power supply apparatus is stopped is denoted by Vauxer, a voltage in the first zener diode ZD1 is denoted by VZ1, and a voltage between the base and an emitter of the NPN transistor is denoted by Veb, the values have a relationship expressed by Formula (1) below:

$$Vovp<(Vauxer-VZ1)*\{R1/(R1+R2)\}+VZ1-Ved \quad (1)$$

In the second aspect of the present invention, there is provided a power supply apparatus capable of switching an output voltage Vout based on an external control signal, the power supply apparatus comprising:

a control unit configured to perform control to stop an output from the power supply apparatus in a case where a voltage applied to a Vcc terminal is higher than a predetermined voltage Vovp, wherein the Vcc terminal is connected to a primary-side auxiliary winding of a transformer via a regulator and the control unit operates based on power supplied to the Vcc terminal in normal operation, a base of an NPN transistor included in the regulator is connected to a ground via a first resistance R1 and a first zener diode ZD1, and a second resistance R2 is provided between the base and a collector of the NPN transistor.

In the third aspect of the present invention, there is provided a printing apparatus comprising:

a power supply apparatus capable of switching an output voltage Vout based on an external control signal; and a printing unit configured to perform printing for a print medium, wherein the power supply apparatus comprises a control unit configured to perform control to stop an output from the power supply apparatus in a case where a voltage applied to a Vcc terminal is higher than a predetermined voltage Vovp, wherein the Vcc terminal is connected to a primary-side auxiliary winding of a transformer via a regulator and the control unit operates based on power supplied to the Vcc terminal in normal operation, a base of an NPN transistor included in the regulator is connected to a ground via a first resistance R1 and a first zener diode ZD1, a second resistance R2 is provided between the base and a collector of the NPN transistor, and in a case where a rectified voltage obtained by rectifying an output from the auxiliary winding is denoted by Vaux, the rectified voltage Vaux at a time the output voltage Vout reaches a voltage at which the output from the power supply apparatus is stopped is denoted by Vauxer, a voltage in the first zener diode ZD1 is denoted by VZ1, and a voltage between the base and an emitter of the NPN transistor is denoted by Veb, the values have a relationship expressed by Formula (1) below:

$$Vovp<(Vauxer-VZ1)*\{R1/(R1+R2)\}+VZ1-Veb \quad (1)$$

According to the present invention, overvoltage protection can be realized with a simple configuration in an output voltage switching type power supply apparatus.

Further features of the present invention will become apparent from the following description of exemplary embodiments with reference to the attached drawings.

DESCRIPTION OF THE EMBODIMENTS

Embodiments of the present invention will be described below with reference to the drawings. It should be noted that configurations described in the embodiments are just examples and the scope of the present invention is not necessarily limited to them.

Figure 1:
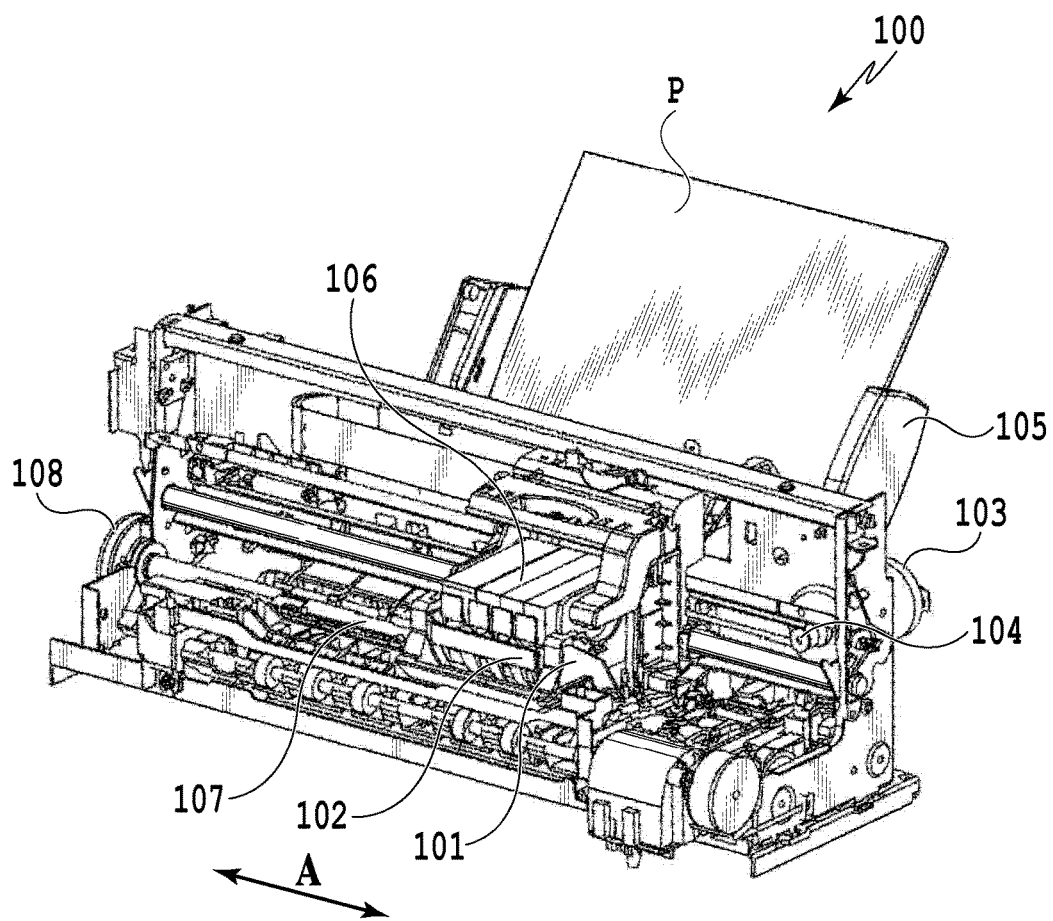
FIG. 1 is a perspective view of an inkjet printing apparatus to which embodiments of the present invention are applied.

Before the description of the embodiments, an inkjet printing apparatus to which a power supply apparatus described later is applied is described. FIG. 1 is a perspective view of an inkjet printing apparatus in the embodiments. In an inkjet printing apparatus (hereinafter referred to as "printing apparatus") 100, a print head 102 which ejects ink and performs printing under an inkjet system is mounted on a carriage 101. A driving force generated by a carriage motor 103 is transferred via a transfer mechanism 104, whereby the carriage 101 is moved back and forth in directions shown by arrow A. At the time of printing, for example, a print medium (such as a print sheet) P fed to the printing apparatus 100 via a feeding mechanism 105 is conveyed to a print position. In the print position, the printing apparatus 100 causes the print head 102 to perform a scan and ejects ink stored in an ink tank 106 from the print head 102 to the print medium P, thereby performing printing. A conveyance roller 107 which conveys the print medium P is driven by a conveyance motor 108. The print medium P is conveyed between scans performed by the print head 102.

In the printing apparatus 100 described above, at the occurrence of a voltage change, there are cases where it is preferable that the operation of the printing apparatus 100 is immediately stopped and it is preferable that the operation of the printing apparatus 100 is continued. For example, in a period in which the printing apparatus 100 performs printing operation, in a case where power consumption exceeds power necessary for the printing operation, there is a possibility that the printing apparatus 100 has a malfunctioned component. Accordingly, it is preferable that the printing operation is immediately stopped even in a case where the power consumption only slightly exceeds the power necessary for the printing operation. In contrast, in a period in which the carriage motor 103 and the conveyance motor 108 are driven, since the positions of the motors are controlled by an encoder (not shown), an allowable range of voltage change is wide. Accordingly, in a case where a voltage changes in driving operation, it is preferable that the driving operation is continued.

Figure 2:
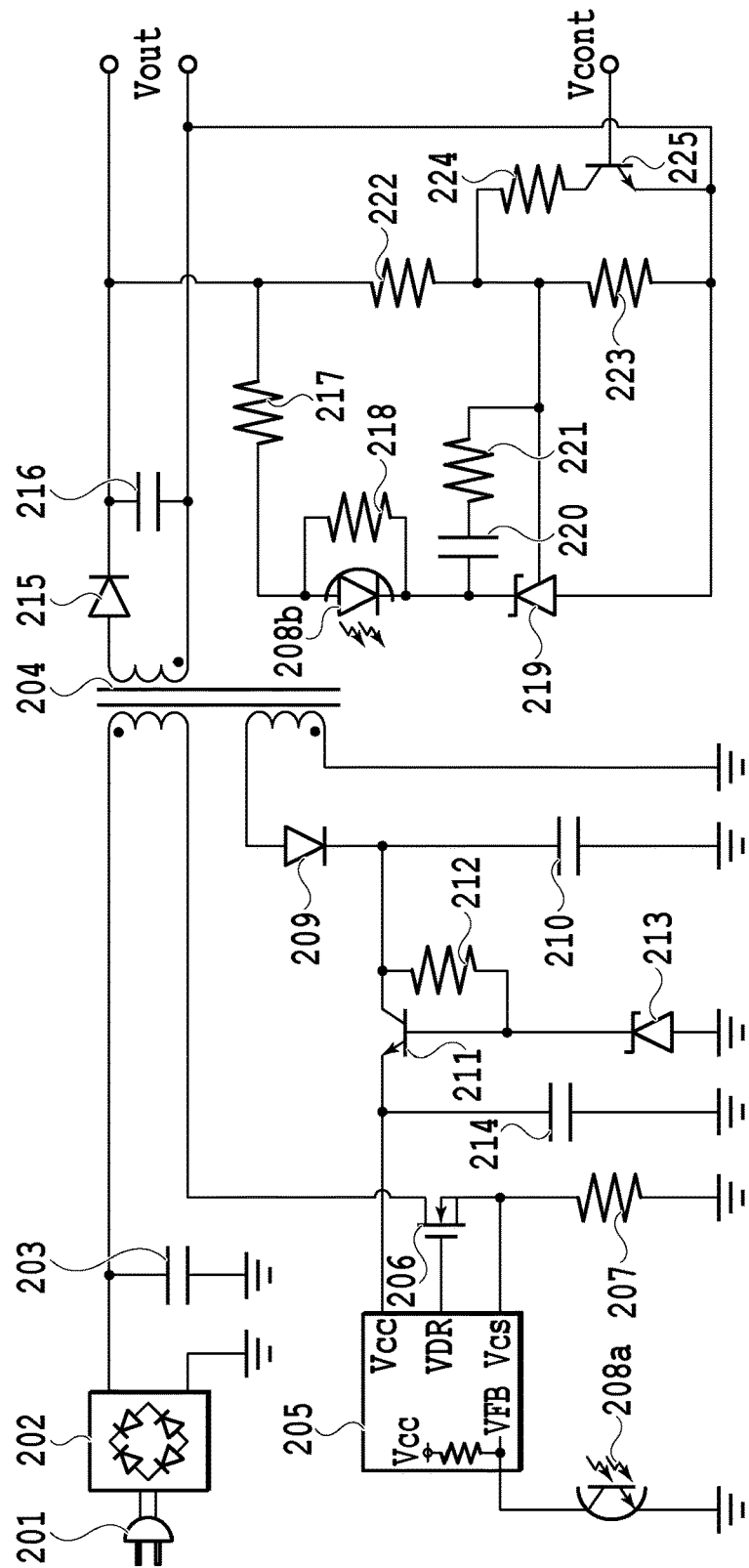
FIG. 2 is a diagram showing an example of a power supply configuration of a general printing apparatus as a comparative example.

FIG. 2 is a diagram showing an example of a power supply configuration in a general printing apparatus 100 as a comparative example. First, a primary side of the power supply configuration (from a commercial power supply 201 to a capacitor 214) is described. A power supply voltage from the commercial power supply 201 is rectified by a diode bridge 202 and a smoothing capacitor 203, flows through a transformer 204, and reaches a ground via a switching element 206 and a current sensing resistance 207. An output of an auxiliary winding of the transformer 204 is rectified by a diode 209 and a capacitor 210 and applied as Vcc for a control IC 205. Further, the auxiliary winding voltage is stabilized by an NPN transistor 211, a zener diode 213 provided in a base of the NPN transistor 211, and a resistance 212. Reference numeral 214 indicates a Vcc capacitor for the control IC 205. In the control IC 205, a VDR signal for driving the switching element 206 is periodically turned on and an output VFB of a photocoupler 208a is compared with a voltage Vcs of the current sensing resistance 207 in the control IC 205. As a result of the comparison, in a case where the voltage Vcs of the current sensing resistance 207 reaches the voltage VFB of the photocoupler 208a, the VDR signal is turned off. A VFB terminal is pulled up to Vcc in the control IC 205.

Next, a secondary side of the power supply configuration of FIG. 2 (from a diode 215 to a transistor 225) is described. The diode 215 and a capacitor 216 rectify a secondary-side output of the transformer 204 to produce Vout. Vout is subjected to voltage division by using resistances 222 and 223 and then applied to a reference terminal of a shunt regulator 219. Vout is connected to a photocoupler 208b via a current limiting resistance 217. A cathode of the photocoupler 208b is connected to the shunt regulator 219. A resistance 221 and a capacitor 220 determine a gain of a feedback circuit. A resistance 218 is provided to supply a bias current to the shunt regulator 219.

A voltage obtained by subjecting Vout to voltage division by using the resistances 222 and 223 is applied to the reference terminal of the shunt regulator 219 and a difference between the voltage and a reference voltage in the shunt regulator 219 is transferred to the control IC 205 via the photocoupler 208. The resistance 223, which is one of the resistances used to subject Vout to voltage division, is connected in parallel to the resistance 224, a transistor 225 is further provided to turn on and off the resistance 224, and a control signal Vcont is externally applied to a base of the transistor 225. In the power supply circuit configuration shown in FIG. 2, in a case where Vcont is low (hereinafter simply referred to as "L"), one end of the resistance 224 is released. Accordingly, the voltage obtained by subjecting Vout to voltage division by using the resistances 222 and 223 is applied to the reference terminal of the shunt regulator 219. In contrast, in a case where Vcont is high (hereinafter simply referred to as "H"), one end of the resistance 224 is at a ground potential and a voltage obtained by voltage division using a combined resistance of the resistances 224 and 223 and the resistance 222 is applied to the reference terminal of the shunt regulator 219. Since a resistance value is reduced by combining the resistance 223 with the resistance 224, the voltage applied to the reference terminal of the shunt regulator 219 decreases. Then, a sink current of the cathode of the shunt regulator 219 decreases, the light emission from the photocoupler 208b is reduced, a Vce voltage of the photocoupler 208a rises, and the VFB voltage rises. In this manner, the Vcs value used for turning off the VDR signal also rises, whereby more current is supplied to the transformer 204. As a result, current supply to the secondary side increases, which enables switching of the output voltage Vout to a higher voltage.

First Embodiment

Figure 3:
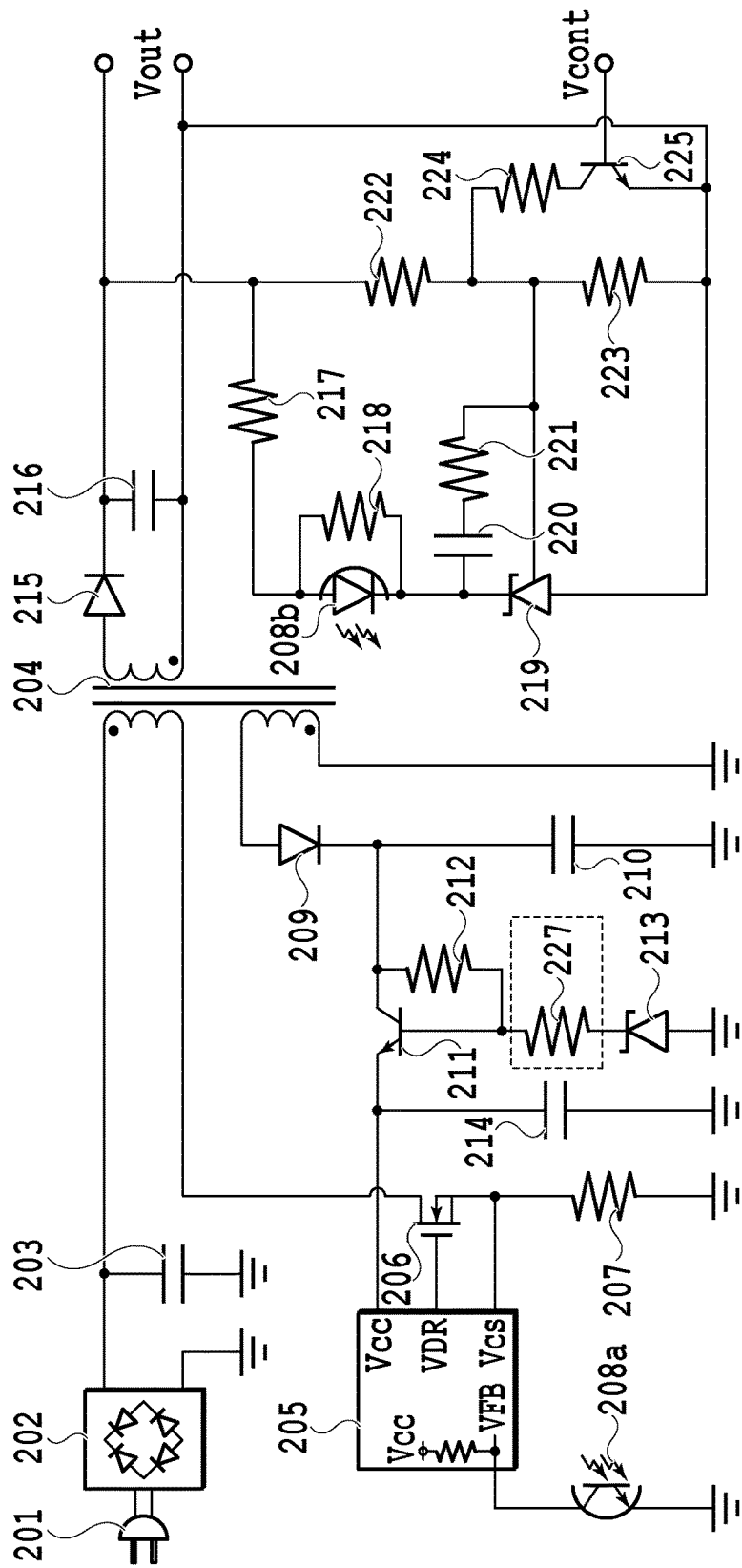
FIG. 3 is a diagram showing an example of a power supply configuration of a printing apparatus according to a first embodiment of the present invention.

FIG. 3 is a diagram showing an example of a power supply configuration of the printing apparatus 100 according to the first embodiment of the present invention. The power supply configuration of the present embodiment is identical to the power supply configuration of the comparative example (FIG. 2) except that a resistance 227 is added. In FIG. 3, the resistance 227 is marked with a dotted line. The power supply configuration of the present embodiment is described below with a focus on a difference from the power supply configuration of the comparative example shown in FIG. 2 (hereinafter referred to as "comparative configuration"). In the description of the present embodiment, the same features as those in the comparative technique are denoted by the same reference numerals and the description of commonality with the comparative technique is simplified or omitted.

Figure 4A:
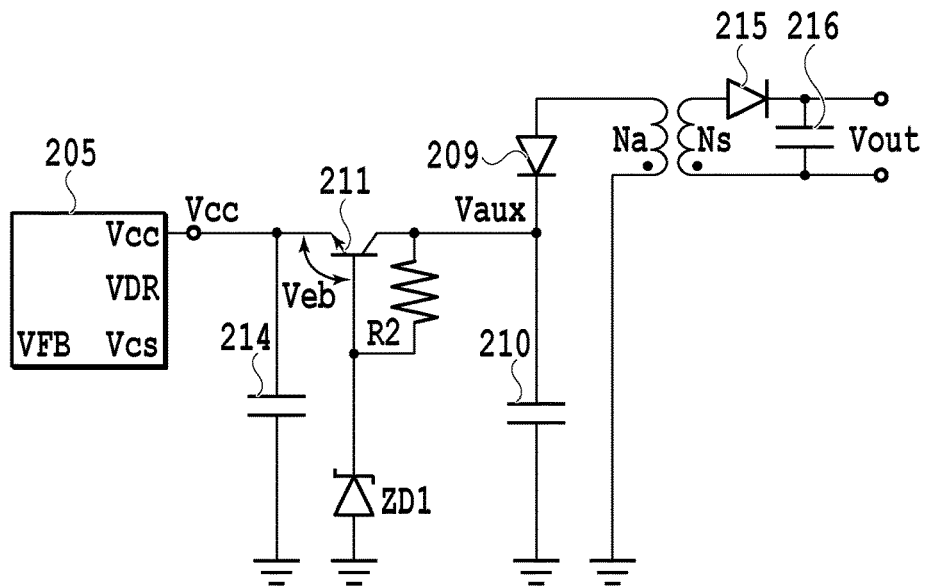
FIG. 4A is a diagram showing a part of the general power supply configuration.

FIG. 4A is a diagram showing a part of the comparative configuration. For simplification of description, FIG. 4A shows the zener diode 213 as "ZD1", a zener voltage thereof as "VZ1," and the resistance 212 and a resistance value thereof as "R2". In general, a Vcc terminal of the control IC is a terminal for obtaining power supply of the control IC. In a case where a voltage applied to this terminal becomes equal to or higher than a predetermined voltage, a malfunction of the control IC may occur. Accordingly, there is a control IC having a protection function of stopping the operation of the control IC in a case where the voltage applied to the Vcc terminal becomes equal to or higher than the predetermined voltage. It is assumed that the control IC 205 of the present embodiment has the protection function and stops the operation of the control IC 205 in a case where the voltage applied to the Vcc terminal becomes equal to or higher than a predetermined voltage Vovp. In the comparative configuration comprising the control IC 205 described above, a relationship among the secondary-side output voltage Vout, a rectified voltage Vaux obtained by rectifying the output of the primary-side auxiliary winding, the number of turns Ns in a secondary-side winding in the transformer, and the number of turns Na in the primary-side auxiliary winding is expressed by Formula 2 below.

$$Vaux = (Na/Ns) * Vout \qquad \text{(Formula 2)}$$

Further, a base potential of the NPN transistor 211 is fixed by the zener diode ZD1. Accordingly, in a case where a voltage between the base and emitter of the NPN transistor 211 is denoted by Veb, Vcc supplied to the control IC 205 is expressed by Formula 3 below.

$$Vcc = VZ1 - Veb \qquad \text{(Formula 3)}$$

In a case where the minimum Vcc necessary for the operation of the control IC 205 is denoted by Vuvlo, the zener voltage VZ1 of the zener diode ZD1 can be set to satisfy Formula 4 below.

$$VZ1 > Vuvlo + Veb \qquad \text{(Formula 4)}$$

Figure 4B:
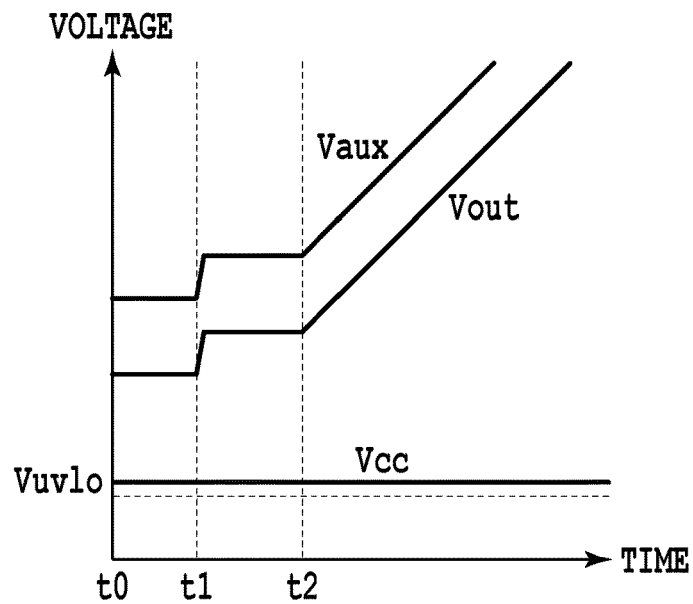
FIG. 4B is a graph showing an example of a relationship among Vout, Vaux, and Vcc in the general power supply configuration.

FIG. 4B is a graph in which the vertical axis indicates voltage and the horizontal axis indicates time. FIG. 4B shows an example of the relationship among the secondary-side output voltage Vout, the primary-side rectified voltage Vaux, and the voltage applied to the Vcc terminal (hereinafter also referred to as "Vcc voltage") in the comparative configuration of FIG. 4A. At t1, in a case where the output voltage Vout is switched, the rectified voltage Vaux is also switched because the output voltage Vout and the rectified voltage Vaux have the relationship of Formula 2. Time t2 indicates a timing of the occurrence of an abnormal voltage rise in the printing apparatus. FIG. 4B shows a rise in the output voltage Vout and the rectified voltage Vaux from t2 onward. According to the comparative configuration shown in FIG. 4A, since the base potential of the NPN transistor 211 is fixed by the zener diode ZD1, the Vcc voltage does not change even in a case where the output voltage Vout is switched. As a result, in the comparative configuration, since the Vcc voltage remains constant even in the case of an excessive rise in the output voltage Vout, the control IC 205 cannot detect the excessive rise in the output voltage Vout.

In the comparative configuration, in the case of an excessive rise in the output voltage Vout, the operation of the control IC 205 is stopped (not shown) by over power protection (hereinafter referred to as "OPP"). The operation is triggered by an increase in a value obtained by multiplying the output voltage Vout by an output current Iout, that is, the output on the secondary side, to an OPP threshold set in the power supply circuit of the comparative configuration along with a rise in the output voltage Vout. The OPP function is therefore necessary in the comparative configuration, which makes the power supply configuration complicated. Further, in a case where the power supply is at light load, it may take time to detect OPP. Time required to stop power supply to the control IC 205 may vary depending on load conditions in the case of an excessive voltage rise.

Figure 5A:
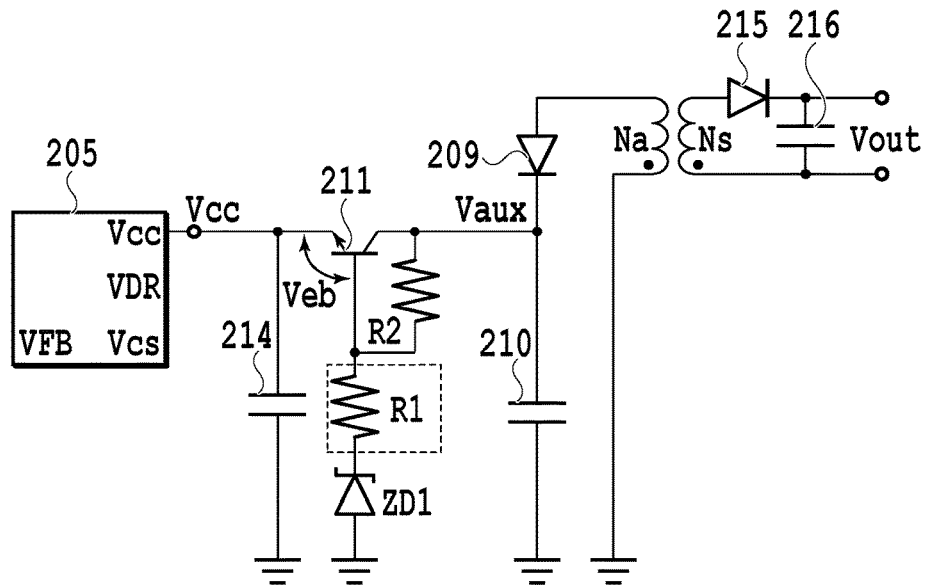
FIG. 5A is a diagram showing a part of the power supply configuration according to the first embodiment of the present invention.

FIG. 5A is a diagram showing a part of the power supply configuration according to the first embodiment of the present invention. For simplification of description, FIG. 5A shows the zener diode 213 as "ZD1," the zener voltage thereof as "VZ1," the resistance 227 and a resistance value thereof as "R1," and the resistance 212 and the resistance value thereof as "R2." As described above, the power supply configuration of the present embodiment is identical to the comparative configuration except that R1 is added. In FIG. 5A, R1 is marked with a dotted line.

In the power supply configuration of FIG. 5A, in a case where the rectified voltage Vaux rises and a voltage input via R2 exceeds the zener voltage VZ1, current flows through R2, R1, and the zener diode ZD1. At this time, the base potential of the NPN transistor 211 increases or decreases according to the current flowing through R1. That is, a rise in the output voltage Vout is reflected in the Vcc voltage and the control IC 205 can thus detect the rise in the output voltage Vout immediately. In the power supply configuration of FIG. 5A, a relationship among Vaux, VZ1, R1, R2, and Veb is expressed by Formula 5 below.

$$Vcc=(Vaux-VZ1)*\{R1/(R1+R2)\}+VZ1-Veb \quad \text{(Formula 5)}$$

The rectified voltage Vaux at the time the output voltage Vout reaches a voltage at which the output from the power supply apparatus is stopped is denoted by Vauxer. The control IC 205 can detect an excessive rise in the output voltage Vout by setting a relationship among Vovp, Vauxer, VZ1, R1, R2, and Veb as expressed by Formula 6 below. The control IC 205 stops the operation of the control IC 205 in a case where an excessive rise in the output voltage Vout is detected.

$$Vovp<(Vauxer-VZ1)*\{R1/(R1+R2)\}+VZ1-Veb \quad \text{(Formula 6)}$$

Figure 5B:
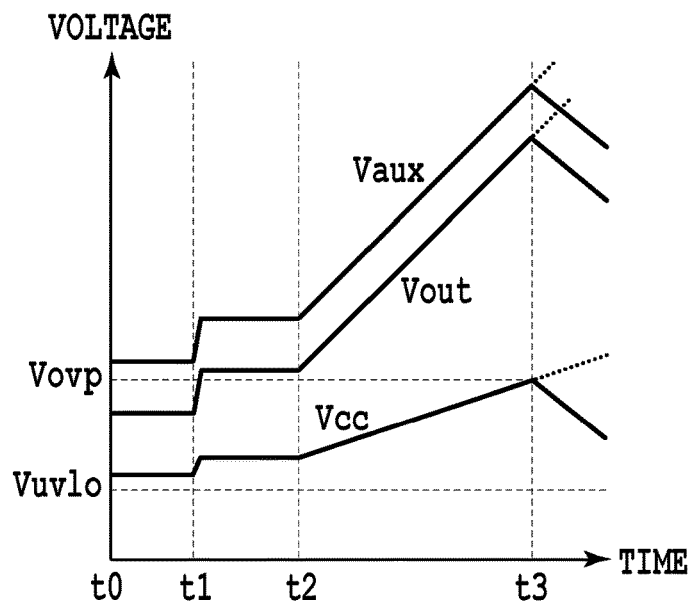
FIG. 5B is a graph showing an example of the relationship among Vout, Vaux, and Vcc in the power supply configuration according to the first embodiment of the present invention.

FIG. 5B is a graph in which the vertical axis indicates voltage and the horizontal axis indicates time. FIG. 5B shows an example of the relationship among the secondary-side output voltage Vout, the primary-side rectified voltage Vaux, and the Vcc voltage in the power supply configuration of FIG. 5A. FIG. 5B shows a rise in the output voltage Vout and the rectified voltage Vaux from t2 onward like the comparative configuration. According to the power supply configuration shown in FIG. 5A, since the base potential of the NPN transistor 211 increases or decreases depending on the current flowing through R1, the Vcc voltage rises as the output voltage Vout rises. At t3, the Vcc voltage rises and reaches a predetermined voltage Vovp and the control IC 205 stops the operation of the power supply. After the operation of the power supply is stopped, the output voltage Vout, the rectified voltage Vaux, and the Vcc voltage drop from t3 onward.

As described above, the power supply apparatus of the present embodiment comprises the regulator to keep the Vcc voltage within the voltage range in which the control IC is operable. Since the Vcc voltage rises following the secondary-side output voltage Vout, the control IC can control the operation of the power supply based on monitoring of the Vcc voltage. That is, overvoltage protection can be realized with a simple configuration in the output voltage switching type power supply apparatus.

Second Embodiment

Figure 6A:
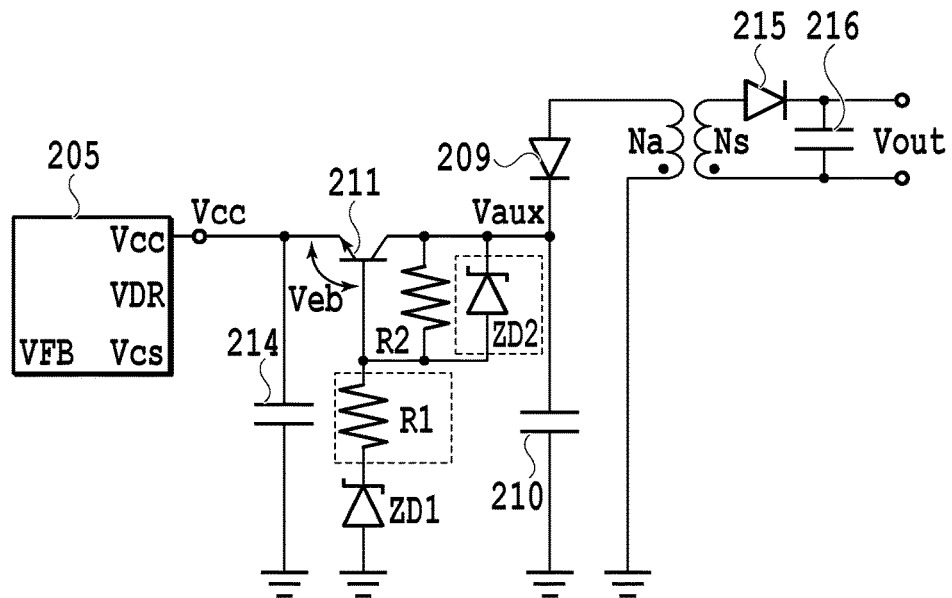
FIG. 6A is a diagram showing a part of a power supply configuration according to a second embodiment of the present invention.
Figure 6B:
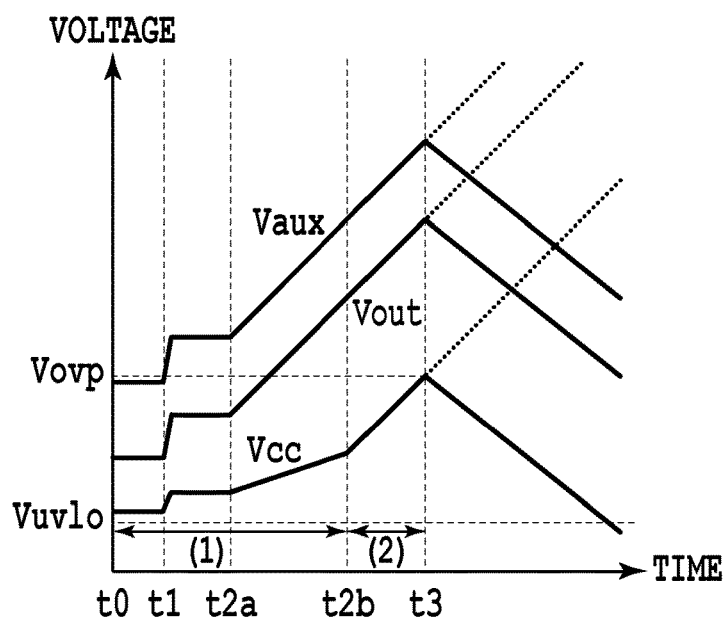
FIG. 6B is a graph showing an example of the relationship among Vout, Vaux, and Vcc in the power supply configuration according to the second embodiment of the present invention.

FIG. 6A is a diagram showing a part of a power supply configuration according to a second embodiment of the present invention. The power supply configuration of the present embodiment is identical to the power supply configuration of the first embodiment except that a zener diode ZD2 is added. In FIG. 6A, the zener diode ZD2 is marked with a dotted line. FIG. 6B is a graph in which the vertical axis indicates voltage and the horizontal axis indicates time. FIG. 6B shows an example of the relationship among the secondary-side output voltage Vout, the primary-side rectified voltage Vaux, and the Vcc voltage in the power supply configuration of FIG. 6A.

As described with reference to FIG. 4B, the rectified voltage Vaux increases as the secondary-side output voltage Vout rises. As shown in FIG. 6B, in a period from t0 to t2b (period (1)), the rectified voltage Vaux is not applied to the zener diode ZD2 and current flows to the zener diode ZD1 through the resistance R2 and resistance R1. Accordingly, the base potential of the NPN transistor 211 is equal to a potential obtained by adding a voltage across the resistance R1 to the voltage applied to the zener diode ZD1. As a result, the Vcc voltage is equal to a potential obtained by subtracting a base-emitter voltage Veb of the NPN transistor 211 from the base potential. In the power supply configuration of FIG. 6A, a relationship between Vaux and Vcc is expressed by Formula 7 below.

$$Vcc=(Vaux-VZ1)*\{R1/(R1+R2)\}+VZ1-Veb \quad \text{(Formula 7)}$$

As shown in FIG. 6B, in the period (1), the Vcc voltage is equal to a voltage obtained by subjecting the rectified voltage Vaux to voltage division by using R1 and R2. Accordingly, the Vcc voltage rises more slowly than the rectified voltage Vaux.

Next, in a period from t2b to t3 (period (2)), the rectified voltage Vaux is applied to the zener diode ZD2. In a case where there is continuity between the rectified voltage Vaux and the zener diode ZD2, a potential difference between the rectified voltage Vaux and the base potential of the NPN transistor 211 is equal to a zener voltage VZ2 of the zener diode ZD2. Accordingly, the base potential of the NPN transistor 211 has a value obtained by subtracting the zener voltage VZ2 from the rectified voltage Vaux and the Vcc voltage is equal to a potential obtained by subtracting the base-emitter voltage Veb of the NPN transistor 211 from the base potential. In view of the above, the Vcc voltage supplied to the control IC is expressed by Formula 8 below.

$$Vcc=Vaux-VZ2-Veb \quad \text{(Formula 8)}$$

As shown in FIG. 6B, a rise in the Vcc voltage in the period (2) is more rapid than that in the period (1). In the present embodiment, the rate of rise in the Vcc voltage in the period (2) is equal to that in the output voltage Vout and the rectified voltage Vaux in the period (2).

Here, a configuration of producing a suitable Vcc voltage by reducing the primary-side rectified voltage Vaux proportional to the secondary-side output voltage Vout by using, for example, a zener diode like the power supply configuration of the first embodiment is considered. In this case, in a case where a voltage at the time of switching of the output voltage Vout is high, the Vcc voltage may exceed the predetermined voltage Vovp. In a case where the Vcc voltage exceeds the predetermined voltage Vovp, the control IC 205 stops the operation of the power supply.

According to the power supply configuration of the present embodiment, since the rectified voltage Vaux is subjected to voltage division using R1 and R2 in the period (1), the rate of rise in the Vcc voltage is lower than that in the rectified voltage Vaux. On the other hand, in the period (2), the rate of rise in the Vcc voltage is equal to that in the rectified voltage Vaux. Accordingly, even in a case where the output voltage Vout is increased by the output voltage switching function, the Vcc voltage can be equal to or lower than Vovp in normal operation of the power supply and the Vcc voltage can be equal to or higher than Vovp in the case of an excessive rise in the output voltage Vout.

The constants R1, R2, VZ1, and VZ2 in the present embodiment can be obtained by the formulae described above. Specific examples are described below.

(Zener Voltage VZ2)

In a case where the output voltage Vout is within a normal range, the Vcc voltage is required to be lower than the predetermined voltage Vovp at which the control IC 205 stops the operation of the power supply. The relationship among the output voltage Vout, the rectified voltage Vaux, the number of turns Ns in the secondary-side winding in the transformer, and the number of turns Na in the auxiliary winding is expressed by Formula 9 below.

$$Vaux=(Na/Ns)*Vout \qquad \text{(Formula 9)}$$

Since the Vcc voltage (=Vaux−VZ2−Veb) should be lower than the predetermined voltage Vovp at which the control IC 205 stops the operation of the power supply, the relationship among the rectified voltage Vaux, the predetermined voltage Vovp, and Veb is expressed by Formula 10 below.

$$VZ2>Vaux-Vovp-Veb \qquad \text{(Formula 10)}$$

Further, in a case where the rectified voltage Vaux at the time the output voltage Vout reaches a voltage at which the output from the power supply apparatus is stopped is denoted by Vauxer, the relationship among Vauxer, the predetermined voltage Vovp, and Veb is expressed by Formula 11 below.

$$VZ2<Vauxer-Vovp-Veb \qquad \text{(Formula 11)}$$

In view of the above, a range of possible values of VZ2 is expressed by Formula 12 below.

$$Vauxer-Vovp-Veb>VZ2>Vaux-Vovp-Veb \qquad \text{(Formula 12)}$$

(Zener Voltage VZ1)

In the power supply configuration of FIG. 6A, in a case where the minimum Vcc voltage at which the control IC 205 is operable is denoted by Vuvlo, the zener voltage VZ1 is required to be higher than a value obtained by adding the base-emitter voltage Veb of the NPN transistor 211 to Vuvlo.

$$VZ1>Vuvlo+Veb \qquad \text{(Formula 13)}$$

(Resistance R1 and Resistance R2)

In a case where the zener diode ZD2 becomes conducting, R1 raises the base potential of the NPN transistor 211 by using current flowing through R1. At this time, a voltage value of the zener diode ZD2 is selected within an allowable range. Further, R2 is provided to operate the NPN transistor 211. Before the zener diode ZD2 becomes conducting (period (1) in FIG. 6B), the relationship among R1, R2, VZ1, Veb, and Vovp is expressed by Formula 14 below.

$$Vovp>(Vaux-VZ1)*\{R1/(R1+R2)\}+VZ1-Veb \qquad \text{(Formula 14)}$$

As described above, a rise in the rectified voltage Vaux can be detected by the Vcc terminal of the control IC even in the output voltage switching type power supply apparatus by setting the constants to satisfy the relationships expressed by the above formulae. As a result, in the case of an abnormal rise in the output voltage Vout, the control IC can stop the operation of the power supply apparatus.

Third Embodiment

Figure 7A:
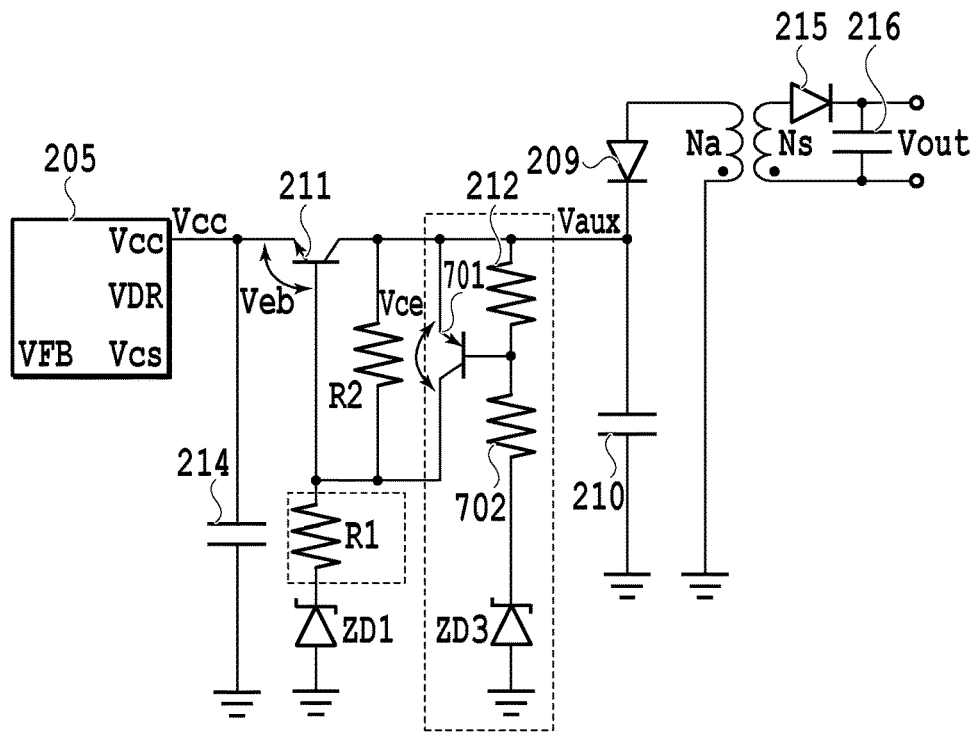
FIG. 7A is a diagram showing a part of a power supply configuration according to a third embodiment of the present invention.
Figure 7B:
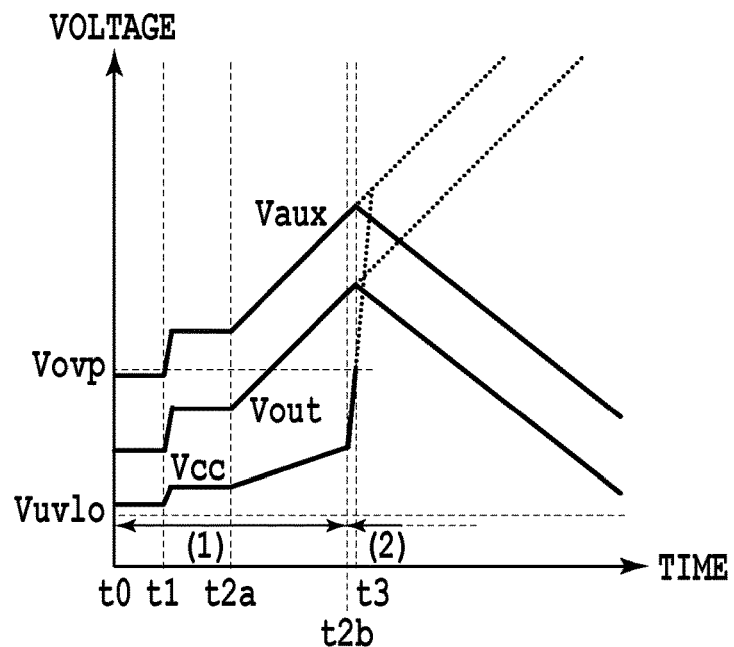
FIG. 7B is a graph showing an example of the relationship among Vout, Vaux, and Vcc in the power supply configuration according to the third embodiment of the present invention.

FIG. 7A is a diagram showing a part of a power supply configuration according to a third embodiment of the present invention. The power supply configuration of the present embodiment is identical to the power supply configuration of the second embodiment (FIG. 6A) except that ZD2 is deleted and a PNP transistor 701, a resistance 702, and a zener diode ZD3 are added. In FIG. 7A, the resistance 212, the PNP transistor 701, the resistance 702, and the zener diode ZD3 are marked with a dotted line. The rectified voltage Vaux is applied to an emitter of the PNP transistor 701 and a collector of the PNP transistor 701 is connected to the base of the NPN transistor 211. A base of the PNP transistor 701 is connected to the ground via the resistance 702 and the zener diode ZD3. FIG. 7B is a graph in which the vertical axis indicates voltage and the horizontal axis indicates time. FIG. 7B shows an example of the relationship among the secondary-side output voltage Vout, the primary-side rectified voltage Vaux, and the Vcc voltage in the power supply configuration of FIG. 7A.

According to the power supply configuration of the present embodiment, in the period (1) in FIG. 7B, the operation until the rectified voltage Vaux reaches a voltage of the zener diode ZD3 (hereinafter referred to as "zener voltage VZ3") is the same as that in the second embodiment.

$$Vcc=(Vaux-VZ1)*\{R1/(R1+R2)\}+VZ1-Veb \qquad \text{(Formula 15)}$$

After the rectified voltage Vaux reaches the zener voltage VZ3, the PNP transistor 701 becomes conducting from t2b (period (2)) and a base current of the PNP transistor 701 starts flowing to the zener diode ZD3. As a result, the emitter and collector of the PNP transistor 701 are short-circuited and the base of the NPN transistor 211 has a value obtained by subtracting an emitter-collector voltage Vce of the PNP transistor 701 from the rectified voltage Vaux.

$$Vcc=Vaux-Vce-Veb \qquad \text{(Formula 16)}$$

After the zener diode ZD3 becomes conducting, the Vcc voltage rapidly rises according to Formula 16 above. After the Vcc voltage reaches the predetermined voltage Vovp, the control IC 205 stops the operation of the power supply apparatus. In FIG. 7B, time required for the Vcc voltage to reach the predetermined voltage Vovp after t2a is equal to time until the PNP transistor 701 is turned on. Accordingly, the control IC 205 can stop the operation of the power supply apparatus early as compared with the power supply configuration of the second embodiment. That is, in the case of an abnormal rise in the output voltage Vout, the control IC 205 can stop the operation of the power supply apparatus at a stage at which the output voltage Vout is low as compared with the power supply configuration of the second embodiment.

In a case where the output voltage Vout is within an allowable range (period a from t0 to t2b), the Vcc voltage is required to be lower than Vovp at which the control IC 205 stops the operation of the power supply apparatus. Accordingly, in the power supply configuration of the present embodiment, the relationship among the zener voltage VZ3, the rectified voltage Vaux, the predetermined voltage Vovp, and Veb is expressed by Formula 17 below.

$$VZ3>Vaux-Vovp-Veb \qquad \text{(Formula 17)}$$

Further, in a case where the rectified voltage Vaux at the time the output voltage Vout reaches the voltage at which the output from the power supply apparatus is stopped is denoted by Vauxer, the relationship among VZ3, Vauxer, Vovp, and Veb is expressed by Formula 18 below.

$$VZ3>Vauxer-Vovp-Veb \qquad \text{(Formula 18)}$$

In view of the above, a range of possible values of VZ3 in the present embodiment is expressed by Formula 19 below.

$$Vauxer-Vovp-Veb>VZ3>Vaux-Vovp-Veb \qquad \text{(Formula 19)}$$

As described above, according to the power supply configuration of the present embodiment, the control IC can detect an abnormal rise in the output voltage Vout at a stage at which the output voltage Vout is low in addition to the advantageous results of the first and second embodiments.

Other Embodiments

In the first to third embodiments described above, each transistor is a bipolar transistor as an example. However, a transistor applied to the power supply is not limited to a bipolar transistor. For example, a field-effect transistor can be applied to the power supplies of the embodiments.

Further, the first to third embodiments have no mention of a rise in the rectified voltage Vaux caused by a spike voltage at the time of switching the output voltage Vout. In an actual power supply circuit, however, ringing caused by leakage flux from the transformer 204 or the like builds up energy a corresponding to the ringing in the capacitor 210. Accordingly, the rectified voltage Vaux is adjusted by using "α" as expressed by Formula 20 below.

$$Vaux=(Na/Ns)*Vout+\alpha \quad \text{(Formula 20)}$$

However, since "α" has no influence on the calculations described in the first to third embodiments, it is only necessary to obtain "α" as appropriate by actual measurement or the like and add it as a correction value of the rectified voltage Vaux.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-155750, filed Aug. 10, 2017, which is hereby incorporated by reference wherein in its entirety.

What is claimed is:

1. A power supply apparatus capable of switching an output voltage Vout, the power supply apparatus comprising:
   a transformer;
   an NPN transistor connected to a primary-side auxiliary winding of the transformer;
   a second resistance R2 connected between a base and a collector of the NPN transistor;
   a first zener diode whose anode is connected to a ground;
   a first resistance R1 connected between the base of the NPN transistor and a cathode of the first zener diode, the first resistance R1 being connected to the second resistance R2 in series; and
   a controller configured to operate based on power supplied to a Vcc terminal connected to the primary-side auxiliary winding of the transformer via the NPN transistor,
   wherein the NPN transistor is connected to the ground via the first zener diode and first resistance R1,
   the controller determines a voltage value of the Vcc terminal and controls to stop an output from the power supply apparatus in a case where the voltage value of the Vcc terminal is higher than a predetermined voltage value Vovp, and
   in a case where a rectified voltage obtained by rectifying an output from the primary-side auxiliary winding is denoted by Vaux, the rectified voltage Vaux at a time the output voltage Vout reaches a voltage at which the output from the power supply apparatus is stopped is denoted by Vauxer, a voltage in the first zener diode is denoted by VZ1, and a voltage between the base and an emitter of the NPN transistor is denoted by Veb, the values have a relationship expressed by the following formula:

$$Vovp<(Vauxer-VZ1)*\{R1/(R1+R2)\}+VZ1-Veb \quad (1).$$

2. The power supply apparatus according to claim 1, further comprising:
   a second zener diode provided between the collector and the base of the NPN transistor in parallel to the second resistance R2,
   wherein, in a case where a voltage in the second zener diode is denoted by VZ2, the voltage VZ2 satisfies the following formula:

$$Vauxer-Vovp-Veb>VZ2>Vaux-Vovp-Veb.$$

3. The power supply apparatus according to claim 1, further comprising:
   a PNP transistor provided between the collector and the base of the NPN transistor in parallel to the second resistance R2;
   a third resistance;
   a fourth resistance; and
   a third zener diode,
   wherein an emitter of the PNP transistor is connected to the collector of the NPN transistor,
   a collector of the PNP transistor is connected to the base of the NPN transistor,
   a base of the PNP transistor is connected to the emitter of the PNP transistor via the third resistance, and
   the base of the PNP transistor is further connected to the ground via the fourth resistance and the third zener diode, and
   in a case where a voltage in the third zener diode is denoted by VZ3, the voltage VZ3 satisfies the following formula:

$$Vauxer-Vovp-Veb>VZ3>Vaux-Vovp-Veb \quad (3).$$

4. A power supply apparatus capable of switching an output voltage Vout, the power supply apparatus comprising:
   a transformer;
   an NPN transistor connected to a primary-side auxiliary winding of the transformer;
   a second resistance R2 connected between a base and a collector of the NPN transistor;
   a first zener diode whose anode is connected to a ground;
   a first resistance R1 connected between the base of the NPN transistor and a cathode of the first zener diode, the first resistance R1 being connected to the second resistance R2 in series; and
   a controller configured to operate based on power supplied to a Vcc terminal connected to the primary-side auxiliary winding of the transformer via the NPN transistor,
   wherein the NPN transistor is connected to the ground via the first zener diode and first resistance R1, and
   the controller determines a voltage value of the Vcc terminal and controls to stop an output from the power supply apparatus in a case where the voltage value of the Vcc terminal is higher than a predetermined voltage Vovp.

5. The power supply apparatus according to claim 4, further comprising a second zener diode provided between the collector and the base of the NPN transistor in parallel to the second resistance R2.

6. The power supply apparatus according to claim 4, further comprising:

a PNP transistor provided between the collector and the base of the NPN transistor in parallel to the second resistance R2;
a third resistance;
a fourth resistance; and
a third zener diode,
wherein an emitter of the PNP transistor is connected to the collector of the NPN transistor,
a collector of the PNP transistor is connected to the base of the NPN transistor,
a base of the PNP transistor is connected to the emitter of the PNP transistor via the third resistance, and
the base of the PNP transistor is further connected to the ground via the fourth resistance and the third zener diode.

7. The power supply apparatus according to claim 4, wherein the output of the power supply apparatus is supplied to a printing unit.

8. A printing apparatus comprising:
a power supply apparatus capable of switching an output voltage Vout; and
a printing unit configured to perform printing for a print medium,
wherein the power supply apparatus comprises:
a transformer;
an NPN transistor connected to a primary-side auxiliary winding of the transformer;
a second resistance R2 connected between a base and a collector of the NPN transistor;
a first zener diode whose anode is connected to a ground;
a first resistance R1 connected between the base of the NPN transistor and a cathode of the first zener diode, the first resistance R1 being connected to the second resistance R2 in series; and
a controller configured to operate based on power supplied to a Vcc terminal connected to the primary-side auxiliary winding of the transformer via the NPN transistor,
wherein the NPN transistor is connected to the ground via the first zener diode and first resistance R1,
the controller determines a voltage value of the Vcc terminal and controls to stop an output from the power supply apparatus in a case where the voltage value of the Vcc terminal is higher than a predetermined voltage value Vovp, and
in a case where a rectified voltage obtained by rectifying an output from the primary-side auxiliary winding is denoted by Vaux, the rectified voltage Vaux at a time the output voltage Vout reaches a voltage at which the output from the power supply apparatus is stopped is denoted by Vauxer, a voltage in the first zener diode is denoted by VZ1, and a voltage between the base and an emitter of the NPN transistor is denoted by Veb, the values have a relationship expressed by the following formula:

$$Vovp < (Vauxer - VZ1) * \{R1/(R1+R2)\} + VZ1 - Veb \quad (1).$$

* * * * *